United States Patent [19]
Nakamura

[11] 4,340,295
[45] Jul. 20, 1982

[54] COMPOSITE INFORMATION RECORDING DEVICE
[75] Inventor: Hiroya Nakamura, Kunitachi, Japan
[73] Assignee: Konishiroku Photo Industry Co., Ltd., Tokyo, Japan
[21] Appl. No.: 222,303
[22] Filed: Jan. 5, 1981
[30] Foreign Application Priority Data
Jan. 14, 1980 [JP] Japan ..................................... 55/2119
[51] Int. Cl.³ .......................................... G03G 15/00
[52] U.S. Cl. .................................. 355/14 R; 355/7; 355/11
[58] Field of Search ........... 355/14 R, 14 SH, 14 CH, 355/35 H, 7, 8, 66, 11; 430/126, 48; 118/624; 358/285, 286, 300

[56]  References Cited
U.S. PATENT DOCUMENTS

| 4,027,961 | 6/1977 | Starkweather ................. 358/300 X |
| 4,046,471 | 9/1977 | Branham et al. ............... 355/3 R X |
| 4,122,462 | 10/1978 | Hirayama et al. .............. 355/3 R X |
| 4,169,275 | 9/1979 | Gunning ............................. 355/8 X |
| 4,204,725 | 5/1980 | Distefano et al. ......... 355/14 CH X |
| 4,241,990 | 12/1980 | Fisli ...................................... 355/11 |

Primary Examiner—Arthur C. Prescott
Attorney, Agent, or Firm—James E. Nilles

[57] ABSTRACT

A composite information recording device comprising a first electrostatic image forming means adapted to scan the image of an original on a copy board and to form the original image as a latent image on an image forming member, a second electrostatic image forming means adapted to form the image of an information supplied externally in the form of an electric signal as a latent image on the image forming member, and original position appointing means movable along the side edge of the copy board in the image scanning direction. The device further comprises means for switching the recording mode from one mode in which the latent image is formed by one of the latent image forming means to another mode in which the latent image is formed by the other latent image forming means when the original position appointing means provides its output, masking position appointing means movable along the side edge of the copy board perpendicular to the direction of scanning of the image, and controlling means adapted to control the second electrostatic latent image forming means in accordance with the masking signals delivered by the masking position appointing means during the formation of the electrostatic latent image by the first electrostatic latent image forming means.

3 Claims, 5 Drawing Figures

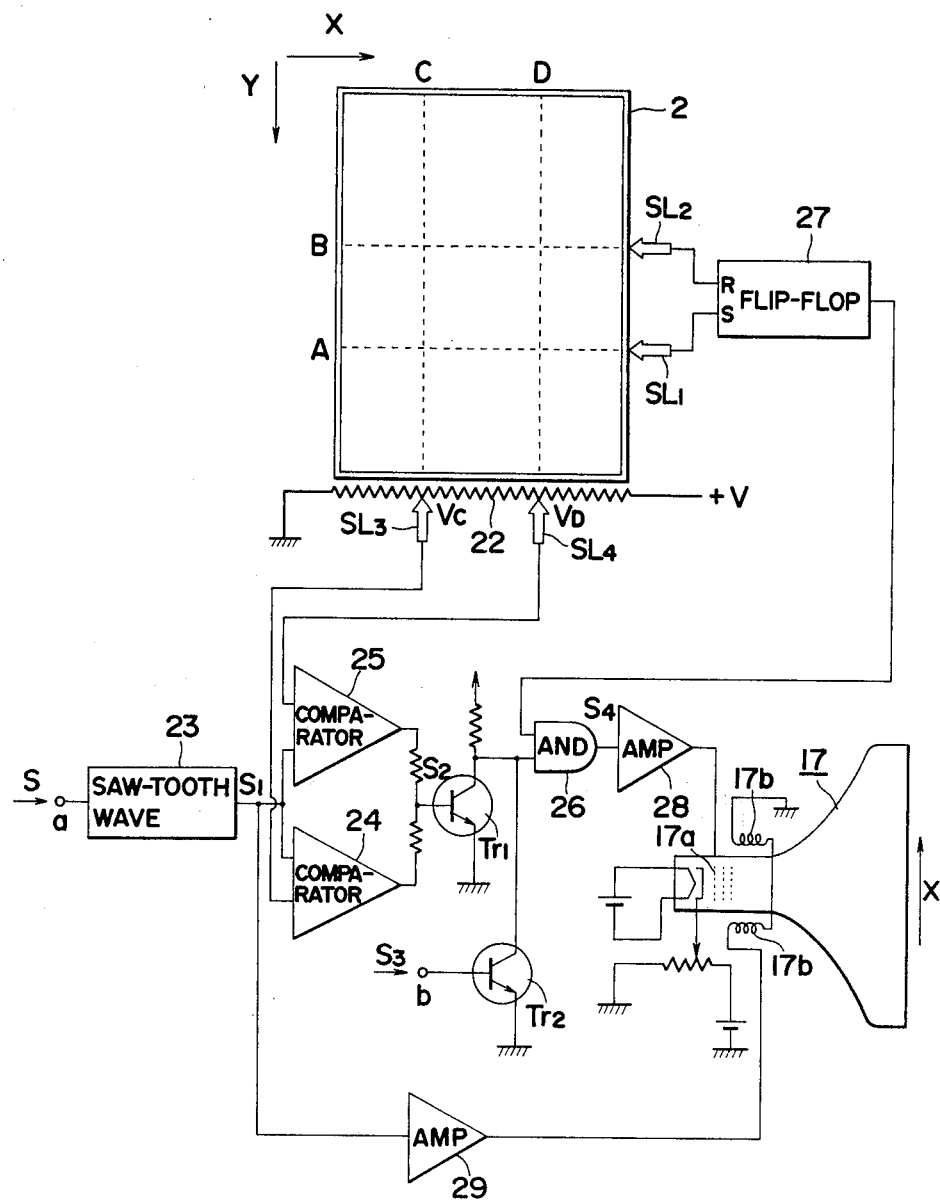

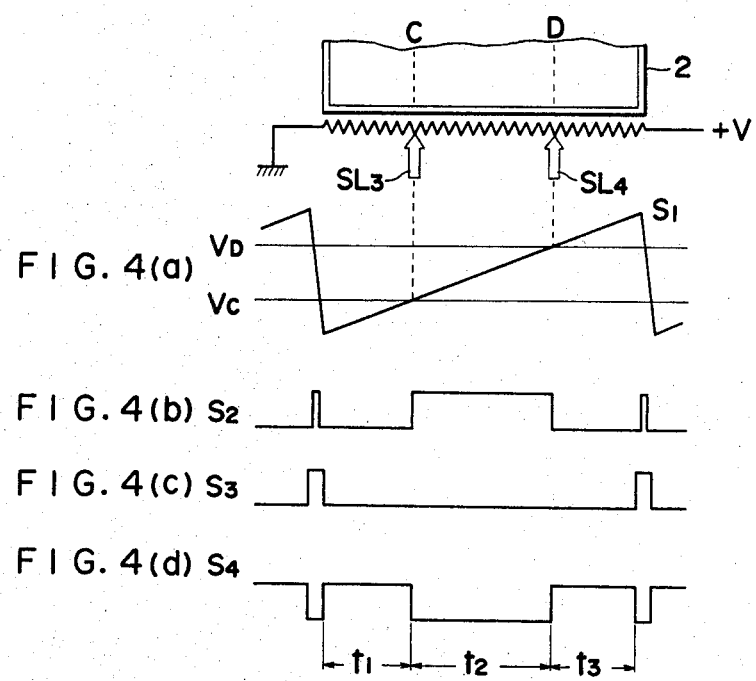
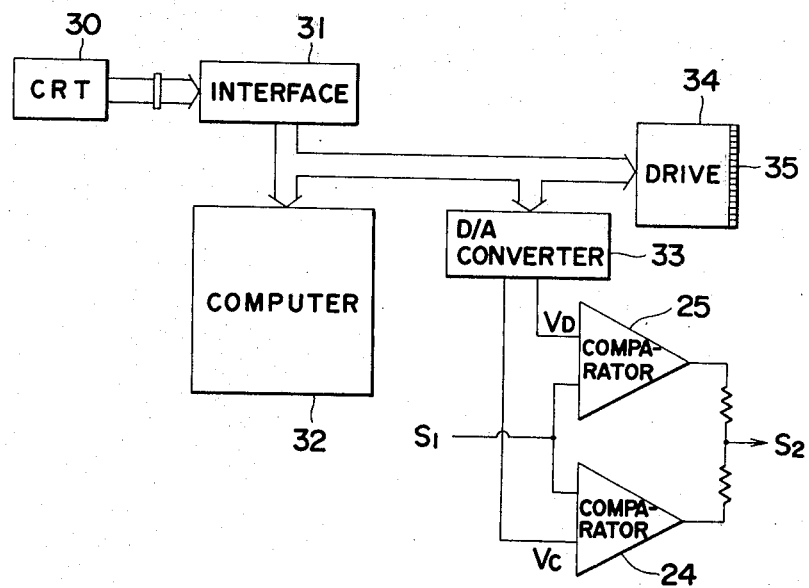

COMPOSITE INFORMATION RECORDING DEVICE

BACKGROUND OF THE INVENTION

1. Field of the Invention

The present invention relates to a composite information recording device adapted to record a composite information composed of the image of an original and an information supplied as an electric signal from the outside. More particularly, the invention is concerned with a masking technique for erasing the unnecessary part of the image of original on an image forming machine.

2. Description of the Prior Art

Such a device has been known as adapted to construct a composite information from the image of an original such as a book, magazine, printed matters, photographs, copied materials and so forth and an information (referred to as external information signal image, hereinafter) supplied in the form of an electric signal such as input information from a key board or a word processor and an output information from a computer or a communication line, and to record the composite information thus formed on a sheet of recording paper. This type of device is referred to as a composite information recording device. The use of this device is now spreading in the field of recording of informations. The composite information recording device has an image forming member on which the image of the original and the external information signal image are formed as latent images. The latent images are processed in the same manner as the electronic photographic copying machine so that the composite image is composed and recorded.

FIG. 1 schematically shows an example of the composite information recording device. The main body 1 of the device carries a copy board 2 which is reciprocatable in an original scanning direction, an original retainer plate 3 adapted to retain the original M on the copy board 2, and an exposure lamp 4 for illuminating the original M. The light reflected from the original M is introduced to a rotary drum 8 through an optical system including a first mirror 5, lens 6, and a second mirror 7, so as to form the image on the photosensitive member 8a on the surface of the drum 8. A mechanical shutter 9 for interrupting the reflected light is interposed in the path of light, and selectively opens and closes the light path by an actuator 10 including a solenoid.

On the periphery of the rotary drum 8, disposed successively are an electric charger 11, developing device 12, transfer electrode 13, separating electrode 14, charge removing electrode 15, and a cleaning device 16.

At the upstream side of the developing device 12 as viewed in the direction of rotation of the rotary drum 8, disposed is a scanning reproduction device 17 adapted for converting the electric signal representing the external information into an optical image and for forming the image on the photosensitive member 8a. The scanning reproduction device 17 is constituted, for example, by an optical fiber tube, thin window recording tube, laser scanning device and so forth. A reference numeral 18 denotes a tray for feeding the recording paper, while numeral 19 designates a carrier device for carrying the recording paper after the transfer. A reference numeral 20 designates a fixing device for fixing the composite image developed on the recording paper, and a reference numeral 21 designates a receiving tray for receiving the recording paper on which the image has been fixed already.

Slide levers $SL_1$, $SL_2$ are movable along side edge of the copy board 2 in the direction of movement of the copy board 2. These levers are provided for appointing the position of the image of original in the composite image. If the operator beforehand manually operates these levers $SL_1$, $SL_2$ in conformity with the image of original, the slide levers $SL_1$, $SL_2$ effects the switching between the image of original and external information signal image, in cooperation with the switches $SW_1$, $SW_2$ provided on the body 1 of the device.

FIG. 2 shows an example of a composite image. A picture of an automobile is placed at the center $F_2$ of the central region F of the recording paper. This picture is fed from an original. In the regions E and G at the upper and lower sides of the picture, inserted are descriptions of the automobile. These descriptions are fed as electric signals from a key board. For recording this composite image, an original M carrying the picture of the automobile is placed on the copy board 2, with the both sides of the picture covered by white masks $K_1$, $K_2$. On the other hand, slide levers $SL_1$ and $SL_2$ are set at the boundaries between the regions E and F and between the regions F and G. As the recording operation is started, the copy board 2 start to move, so that the rotary drum 8 is rotated to perform a series of electrophotographic treatment.

In this state, the light reflected from the original M does not reach the photosensitive member 8a on the drum 8, because the light path is closed by the shutter 9.

Meanwhile, the scanning reproduction device 17 operates from the beginning of the recording operation, so as to form the optical image of the character information (description of the automobile) fed from the outside as an electric signal and to project the image on the photosensitive member 8a. Then, as the copy board 2 is moved progressively, the external information signal is successively projected on the photosensitive member 8a as an optical image by the scanning reproduction device 17, so that the description is recorded as a latent image on the region of the photosensitive member 8a corresponding to the region E. Thereafter, as the switch $SW_1$ is actuated by the slide lever $SL_1$, a switching signal is produced to turn the scanning reproduction device 17 inoperative and, at the same time, the shutter actuating means 10 is energized to open the shutter 9 so that the light reflected from the original M is projected on the photosensitive member 8a. Thus, the picture of the automobile is formed as a latent image on the region of the photosensitive member 8a corresponding to the region $F_2$ of the recording paper. Since the portions corresponding to the regions $F_1$ and $F_3$ are covered with white masks $K_1$ and $K_2$, these portions are subjected to strong reflected light so that no latent image is formed at the portions of photosensitive member 8a corresponding to these regions. Thereafter, the switch $SW_2$ is operated by means of the slide lever $SL_2$, so that a switching signal is formed again. In consequence, the scanning reproduction device 17 is actuated again to project the external information signal image on the photosensitive member 8a and the shutter actuating means 10 is de-energized to shut the shutter 9 thereby to cut off the light reflected from the original M. Thus, the description is gradually formed as a latent image on the portion of the photosensitive member 8a corresponding to the region G. The electrostatic latent image is recorded as a toner image on the recording paper after an electrophotographic treatment.

In the conventional recording system of the type described, the switching between the original image in the longitudinal or feeding direction of the recording paper (Y direction in Figure) and the external information signal image can be made comparatively easily by automatically switching the shutter 9 through setting the slide levers $SL_1$ and $SL_2$. However, a troublesome and time consuming manual work has been necessary for the masking operation by the masks $K_1$, $K_2$ in the lateral (transverse) direction of the recording paper (X direction in Figure). The original M is placed on the copy board 2 upside down, i.e. with the image surface directed downward. The masks $K_1$, $K_2$ have to be placed in such a manner as to cover the unnecessary part of the image. However, it is extremely difficult to correctly locate the masks, because the boundaries between the portion to be recorded and the unnecessary portion of the image cannot be directly checked visually.

SUMMARY OF THE INVENTION

Under these circumstances, the invention aims as its principal object to provide a device in which the erasing of the recording region for the unnecessary part of original image is made solely by an electric treatment, without using any mask, thereby to overcome the abovedescribed problems of the prior art.

To this end, according to the invention, there is provided a composite information recording device in which masking position appointing means that appoints the boundary of the original recording region are incorporated. The masking position appointing means are movable in the direction of movement of the copy board, i.e. along the side edge perpendicular to the direction of scanning of the original. During the recording of the original image, the electric signal supplied to the scanning reproduction device is controlled by a masking signal issued from the masking position appointing means.

Thus, in the device of the invention, the masking operation is made simply by delivering the masking signal by the masking position appointing means disposed at transverse side edge of the original and by delivering this signal to optical scanning device as the latent image forming means. In other words, all that is required in the masking operation is to set a slider, for example, at the masking position in the transverse direction of the recording paper. Thus, the masking operation is very much simplified as compared with the conventional masking operation employing a mask plate. In addition, the precision of the masking position is enhanced remarkably.

Other objects and advantageous features of the invention will become clear from the following description taken in conjunction with the accompanying drawings.

BRIEF DESCRIPTION OF THE DRAWINGS

FIG. 3 shows a masking circuit of a composite information recording device in accordance with the invention;

FIGS. 4(a), 4(b), 4(c) and 4(d) show waveform charts of a masking signal; and

FIG. 5 shows a masking circuit adapted to deliver, as a digital signal, a masking signal from the outside.

DESCRIPTION OF THE PREFERRED EMBODIMENTS

Figure 1:
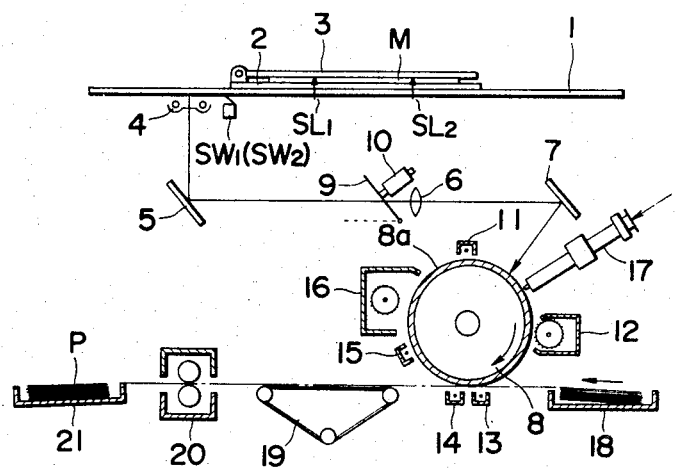
FIG. 1 is a schematic illustration of a conventional composite information recording device.

A preferred embodiment of the invention will be described hereinunder with reference to FIGS. 3 and 4. Masking position appointing sliders $SL_3$, $SL_4$ are provided at one side edge of transverse direction (X direction in FIG. 3) of the copy board 2. These sliders are adapted to be slid on a slidac 22 so that voltages $V_C$ and $V_D$ corresponding to the positions of the sliders are produced as masking signals representing the masking positions. On the other hand, a terminal a receives a synchronization signal S of the scanning reproduction device 17, and a saw-tooth wave generator 23 produces a saw-tooth wave signal $S_1$ which is delivered to one of the terminals of each of two window comparators 24, 25. One 24 of the window comparators receives at its other terminal the masking position signal $V_C$ delivered by one $SL_3$ of the slide levers, while the other masking position signal $V_D$ derived from the other slider $SL_4$ is applied to the other terminal of the other window comparator 25. A switching signal $S_2$ as shown in FIG. 4(b) is obtained at a point of intersection of the two signals $V_C$, $V_D$, as will be seen from FIG. 4(a). This switching signal $S_2$ is inverted by a transistor $Tr_1$. Meanwhile, a transistor $Tr_2$ receives at its base a blanking signal $S_3$ as shown in FIG. 4(c) derived from the terminal b. This signal is synthesized with the inverted switching signal and is delivered to one of the input terminals of an AND gate 26. The other input terminal of the AND gate 26 receives the output from a set-reset type flip-flop circuit 27 the set terminal S of which receives the output from the slide lever $SL_1$ while the reset terminal R thereof receives the output from the slide lever $SL_2$, so that the output from the flip-flop circuit 27 takes a logical value "1" in the period between the delivery of the output from the slide lever $SL_1$ and the delivery of the output from the slide lever $SL_2$. Therefore, only in this period, the composite signal $S_4$ as shown in FIG. 4(d) is voltage-amplified by an image amplifier 28 and is applied upon the grid 17a of the cathode ray tube of the scanning reproduction device 17 such as an optical fiber tube. The saw-tooth wave signal $S_1$ is delivered also to the deflector coil 17b of the scanning reproduction device 17 through an amplifier 29 for a horizontal scanning with the beam.

With the circuit having the described construction, the masking operation is made in a manner explained hereinunder.

Figure 2:
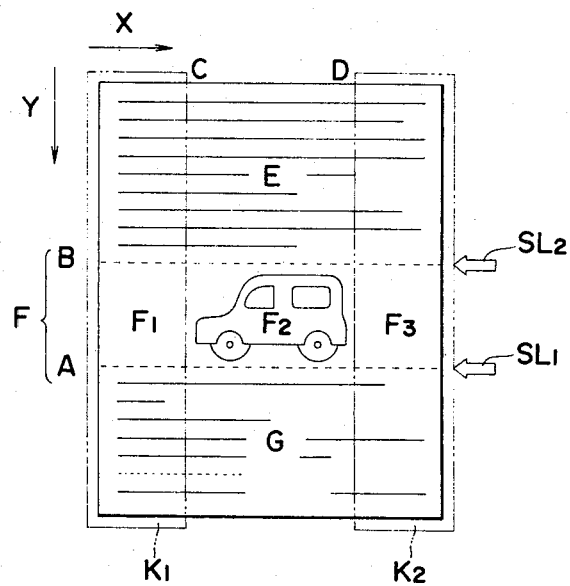
FIG. 2 is an example of lay-out of a composite image formed by the device shown in FIG. 1.

In advance to the recording operation, the slide levers $SL_1$–$SL_4$ are set for appointing the position of the original. The operation for setting the slide levers $SL_3$, $SL_4$ is the masking work. For forming a composite image of a lay-out shown in FIG. 2, the external information is recorded in the region E as the recording operation is started. This procedure has been described already in connection with the conventional device, and therefore, is not detailed here. As the copy board 2 is moved and the slide lever $SL_1$ produces a switching signal, the shutter 9 is opened so that the light reflected from the original M is projected onto the photosensitive member 8a of the rotary drum 8. Simultaneously, the switching signal is applied on the set terminal S of the flip-flop 27 so that the latter produces a logical "1" at its output, which is then delivered to one of the input terminals of the AND gate 26. Meanwhile, the other input terminal of the AND gate 26 receives a composite signal S$_4$ as shown in FIG. 4(d), which is determined by the position at which the slide levers SL$_3$ and SL$_4$ are set. The brightness or intensity of the scanning reproduction device 17 takes the highest level (white level) in the periods t$_1$ and t$_2$, and the lowest level (black level) in the period t$_2$. Therefore, the electric charges on the photosensitive member 8a are all discharged in the regions F$_1$, F$_3$ of the region F shown in FIG. 2, while the charge is never affected in the other regions. Thus, only the image which is to be recorded is left while the other images are completely erased. Thus, the horizontal scanning by the scanning reproduction device 17 erases at the periods t$_1$ and t$_2$ the latent images formed on the photosensitive member 8a thereby to effect the masking. This masking effect is equivalent to that obtained by the conventional masking operation using masking plates.

The formation of the original image in the region F is completed as the copy board 2 moves and the rotary drum 8 rotates. Then, as the slide lever SL$_2$ produces a switching signal, the shutter actuating means 10 are energized to close the shutter 9 to interrupt the light reflected from the original M and, at the same time, the scanning reproduction device 17 comes to receive again the external information signal instead of the composite signal S$_4$, so that the optical image of the external information is projected on the photosensitive member 8a to start the recording on the region G. In this state, the reset terminal R of the flip-flop circuit 27 also receives the switching signal, so that the latter produces logical "0" at its output. Consequently, the supply of the composite signal S$_4$ to the scanning reproduction device 17 is ceased. Thereafter, an electrophotographic treatment is effected in a manner known, which is known per se and, accordingly, is not detailed here.

In the embodiment described heretofore, the masking signals are derived from the slide levers SL$_3$ and SL$_4$ provided at lateral side edge of the copy board. These signals, however, may be transmitted from the outside of the device to the recording device in the form of digital signals. For instance, when it is desired to edit the composite image by means of a cathode ray tube CRT, it is possible to transmit the masking signal from the key board or to pick up the masking signal by making a light pen contact with specific position of information displayed on the CRT.

FIG. 5 shows an example of such an arrangement. The data is transmitted from a CRT display 30 to a one-chip microcomputer 32 through an interface 31. This data includes the masking signals in the form of digital signals. The masking signals are picked up by means of a digital-analog converter 33. The masking signals V$_C$ and V$_D$ thus picked up are then delivered to the comparators 24, 25 shown in FIG. 3. The output from these comparators 24, 25 are processed in the same manner as that explained in connection with FIG. 3.

A reference numeral 34 designates a driving circuit for making a display of the masking positions on a display 35 provided at one lateral side of the copy board 2. The display 35 is constituted by a plurality of light-emitting diodes or liquid crystal segments arrayed in series.

The present invention is applicable not only to the composite information recording device using optical scanning device such as optical fiber tube, but also to the devices using laser beam, light-emitting diodes, small lamps or the like as well as to electrostatic recording devices.

What is claimed is:

1. A composite information recording device comprising: a first electrostatic image forming means adapted to scan the image of an original on a copy board and to form the original image as a latent image on an image forming member; a second electrostatic image forming means adapted to form the image of an information supplied externally in the form of an electric signal as a latent image on the image forming member; original position appointing means movable along the side edge of the copy board in the image scanning direction; means for switching the recording mode from one mode in which the latent image is formed by one of the latent image forming means to another mode in which the latent image is formed by the other latent image forming means when the original position appointing means provides its output; masking position appointing means movable along the side edge of the copy board perpendicular to the direction of scanning of the image; and controlling means adapted to control the second electrostatic latent image forming means in accordance with the masking signals delivered by the masking position appointing means during the formation of the electrostatic latent image by the first electrostatic latent image forming means.

2. A composite information recording device as claimed in claim 1, wherein the masking position appointing means include two slide levers.

3. A composite information recording device as claimed in claim 1, wherein the masking signal is the digital signal received from the outside.

* * * * *